United States Patent [19]

Laub et al.

[11] 3,891,822

[45] June 24, 1975

[54] PULSE HEATED THERMOCOMPRESSION BONDING APPARATUS

[75] Inventors: Joseph L. Laub, Claremont; John F. Hurst, San Gabriel, both of Calif.

[73] Assignee: Unitek Corporation, Monrovia, Calif.

[22] Filed: Apr. 2, 1973

[21] Appl. No.: 347,225

Related U.S. Application Data

[63] Continuation of Ser. No. 135,722, April 20, 1971, abandoned.

[52] U.S. Cl. .................................. 219/85; 219/92
[51] Int. Cl. ............................................... B23k 1/02
[58] Field of Search ................. 219/85; 228/4, 6, 44

[56] References Cited

UNITED STATES PATENTS

| | | | |
|---|---|---|---|
| 3,263,057 | 7/1966 | Conti | 219/85 X |
| 3,358,897 | 12/1967 | Christensen | 219/85 UX |
| 3,384,283 | 5/1968 | Mims | 219/85 UX |

*Primary Examiner*—C. L. Albritton
*Attorney, Agent, or Firm*—Christie, Parker & Hale

[57] ABSTRACT

A pulse heated thermocompression wire bonding apparatus having precise control of bonding temperature and duration. The bonder utilizes an electrically heated holder which surrounds a substantial portion of the barrel of a capillary bonding tip and achieves tip heating by thermal transfer. A thermocouple is attached to the holder to continuously sense the temperature of the bonding tip. The bonder includes a power supply for providing heating power and programming controls to preset the bonding temperature and bond time duration for each bond to be performed by the apparatus. In conjunction with the thermocouple, the programmable bonding controls determine the amount of heat energy supplied to the bonding tip to maintain the tip at the desired bonding temperature throughout the bonding interval. Suitable delays following completion of each bond can also be programmed into the bonder.

9 Claims, 11 Drawing Figures

INVENTORS.
JOSEPH L. LAUB
JOHN F. HURST
BY
Christie, Parker & Hale
ATTORNEYS

FIG. 8
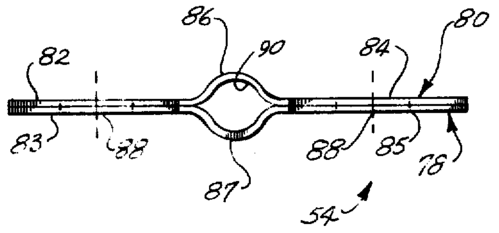
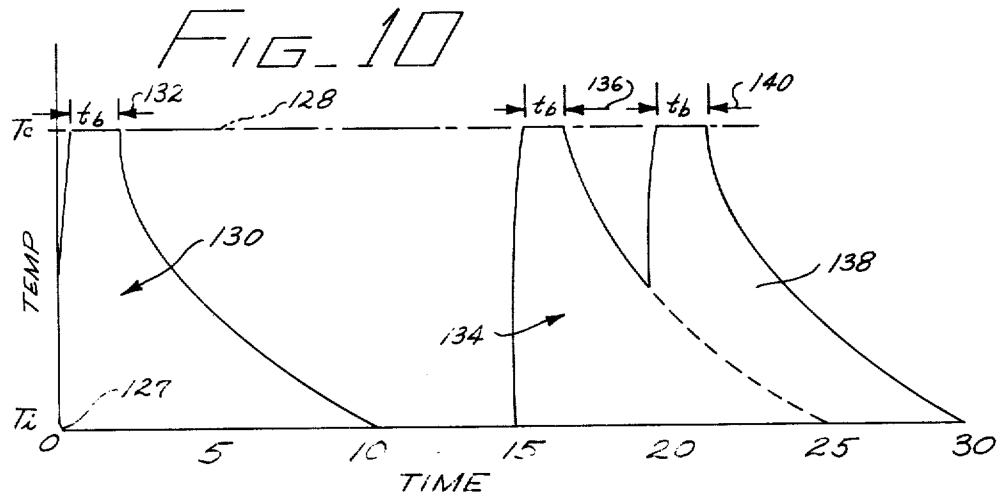
FIG. 7
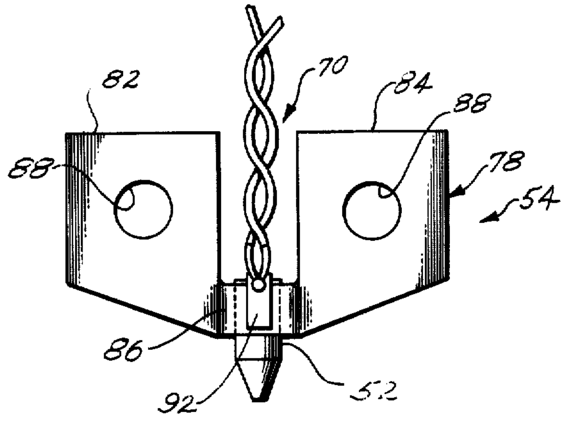
FIG. 6
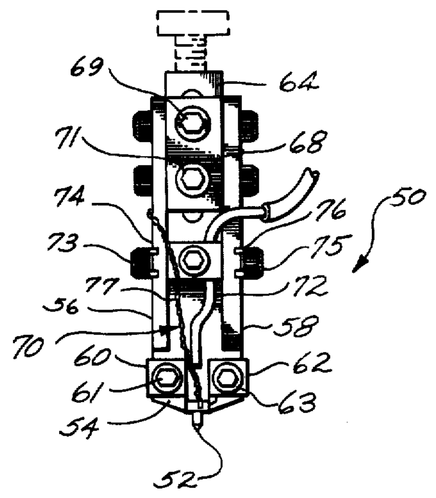

PULSE HEATED THERMOCOMPRESSION BONDING APPARATUS

CROSS-REFERENCE TO RELATED APPLICATIONS

This is a continuation of application Ser. No. 135,722 filed Apr. 20, 1971 now abandoned.

DESCRIPTION OF THE PRIOR ART

The present invention relates to electronic component production apparatus and in particular to pulse heated, thermocompression wire bonders.

Thermocompression wire bonders are typically used to make electrical interconnections between predetermined points on semiconductors such as integrated circuit dice and terminal posts which extend between the interior and exterior of the container in which the die is located. Because of the miniaturization of such components the wires used in making such interconnections are typically gold wires of a few mils in diameter. Such wires are normally threaded through capillary sized passages in bonding tips with which such bonders are equipped.

In certain applications of bonders of this type, the workpieces and the substrates to which the electrical interconnections are to be made are heat sensitive. To accommodate this heat sensitivity, pulse heating techniques with thermocompression bonders have been adopted. Such techniques are based on the principle that sufficient heat can be supplied to a bond location to accomplish satisfactory thermocompression bonds while at the same time limiting the duration of heat application to very short, spaced intervals of time.

The attainment of satisfactory thermocompression bonds requires that a sufficient amount of heat be transferred to the bond location. In the pulse heating approach this is accomplished by raising its temperature above a predetermined point and maintaining it at this average value for a certain limited time interval (e.g. 0.5 sec.) while at the same time applying proper bonding pressure to the bond location by means of the bonding tip. Because the surface area of the capillary tip is extremely limited, the transfer of the necessary amount of heat across the limited surface area of a capillary bonding tip in a limited time interval is difficult. Since the pulse heated theory of thermocompression bonding dicates that the bonding interval be as short as possible to avoid affecting the heat sensitive workpieces, prior art pulse heating techniques have required that the capillary tip be driven to significantly higher peak temperatures in order to achieve an average bonding temperature in the range of 400° - 500°C and to transfer the needed amount of heat to the bond location.

Where the substrate is fabricated of a difficult material, for example, one which has significant heat sinking effects, the transfer of the needed amount of heat energy is made even more difficult imposing the requirement that the capillary tip be driven to peak temperatures on the order of 850°C. In some instances the problem has become sufficiently exaggerated that it has been found that prior art pulse heated bonders and pulse heating techniques are incapable of accomplishing the desired bonding. This is due primarily to the fact that at the extremely high peak temperatures indicated above, oxidation and flaking of the material from which the tip is fabricated is a serious problem and is a significant source of contamination both at the bond location and with respect to the tip itself, causing it to clog and jam.

Other problems encountered in the operation of prior art pulse heated thermocompression wire bonders included lack of control over bonding conditions, particularly bonding temperature and duration. Such bonders operate on the principle that a uniform increment of pulse current is supplied to the tip to provide the heat needed for each bond. However, where the tip has not cooled to its initial temperature, the result of applying the same amount of heating energy each time drives the tip to significantly higher peak temperatures and holds it above the recommended bonding temperature for considerably longer periods of time than the prescribed bonding interval. Not only does this stress the tip itself but it can also affect the quality of the bonds obtained and degrade heat sensitive components upon which the bonder is operating.

Additionally, in the design of pulse heated thermocompression wire bonders it has been the typical prior art approach to pass heating current directly through the tip by making the tip a part of the electric circuit by which heat is supplied to the bonding location. Current is conducted to the tip by means of clamps which hold the tip or in an alternate approach by means of leads welded to the tip. Particularly in the clamped tip arrangement, contact resistance and electrical continuity between the tip and the clamps vary significantly with the result that the tip frequently is not uniformly heated and the area at the outlet from the capillary is run below optimum thereby again departing from the prescribed conditions predicated upon the nature of the wire and the location to which the wire was to be bonded.

SUMMARY OF THE PRESENT INVENTION

The present invention provides a bonder in which the capillary tip is operated at a significantly lower peak temperature than has been characteristic of prior art bonders. The reduction in temperature levels has been found to make a significant contribution to extended tip life. This feature combined with temperature feedback provides significantly greater control over the quality of bonds obtained by the bonder.

The invention provides a pulse heated thermocompression bonding apparatus comprising a capillary bonding tip and a holder for receiving the tip in a thermal transfer relationship therewith. Electric power supply means are provided which are connected to the holder for the capillary tip for supplying electric heating current pulses to the holder, and temperature monitoring means is disposed in a sensing relationship with respect to the holder. The monitoring means and power supply are also interconnected by means for controlling the amount of heating electric current supplied to the holder.

The achieving of bonds of the desired quality at a bonding temperature significantly lower than has heretofore been the practice is accomplished by maintaining bonding pressure at the bonding location with the bonding tip for a longer time interval (on the order of one second). The lower temperature for a longer interval achieves the same desired net amount of heat transfer to the bonding location.

The result of lower operating temperatures is significantly less strain on the tip with the result that oxidation of the tip is reduced and tip life is significantly increased. Similarly, the lower bonding temperature embodies a reduced potential for damage to the hybrids, substrates and other heat sensitive materials to which the interconnecting wire is to be bonded. Whereas prior art bonders normally require one or more auxiliary heat sources to raise the substrate to somewhat elevated temperatures, bonders according to the present invention are able to achieve sufficient heat transfer by means of the tip alone, eliminating, in the case of standard material combinations, the need to heat the substrate and allow it to have wi:es attached to it by a thermocompression bonder while being maintained at room temperature.

By means of programming and the feedback connection between the thermocouple and the power supply, the present bonder is able to obtain precise control of the bonding temperature and the bonding interval with the result that optimum thermocompression bonds are attained without any deleterious side effects with respect to the heat sensitive materials upon which the bonder operates. The bonding apparatus of the present invention embodies two fully adjustable time and temperature channels to thereby permit two completely different and separate bonding schedules to be programmed into the apparatus to exactly tailor the operation of the bonder to th different bonding conditions which are encountered in a typical cycle of bonder operation. In each case the exact temperature for precisely the correct bonding interval is achieved.

DESCRIPTION OF THE DRAWING

These and other advantages of the present invention will be better understood by reference to the following figures of the drawing wherein

FIG. 6 is a front elevational view of the apparatus of FIG. 5;

FIG. 7 is an enlarged view of a bonding tip and a holder according to the present invention;

FIG. 8 is a plan view of the holder of FIG. 7;

FIG. 10 is a time-temperature diagram comparable to FIG. 2 illustrating operation of a bonder according to the present invention.

DESCRIPTION OF A SPECIFIC EMBODIMENT

Figure 3:
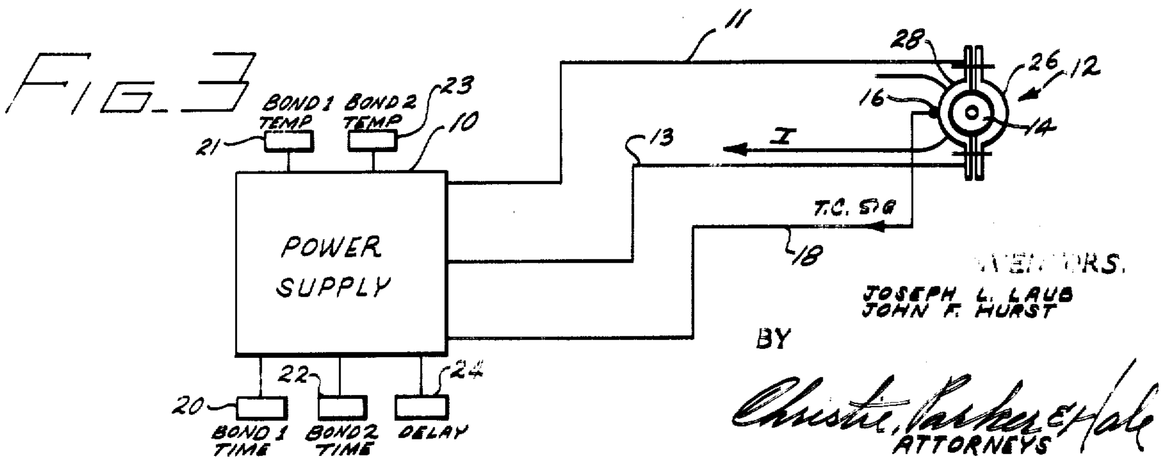
FIG. 3 is a block diagram of the bonding apparatus according to the present invention.

A block diagram of the bonding system according to the present invention is shown in FIG. 3. The system comprises a power supply 10 which is electrically connected to a holder 12 for a capillary bonding tip 14 by electrical conductors 11, 13. A thermocouple 16 is attached to holder 12 and is, in turn, connected by means of a feedback connection 18 to the power supply. The bonding energy from the power supply is determined by controls 20, 21 and 22, 23 which respectively are set to control the time duration and temperature level for each bond to be performed by the bonder. Control 24 is a time delay control, preventing return of the bonding tip to its home position for a predetermined amount of time following completion of a typical bonding operation. This allows the second bond of the two bonds in such a typical operation or bond cycle to cool such that the "tail" of the wire connected at the second bond location will be properly pulled, i.e., the wire will be disconnected, by breaking, without disturbing the soundness of the electrical and mechanical connection at this location when the tip is retracted and returned to its home position.

As indicated in FIG. 3, the thermocompression bonding capillary tip 14 is clamped and held in an opening defined by the arms 26, 28 of holder 12. In this configuration a current path for power supplied from supply 10 is provided through arms 26 and 28 and around tip 14 such that heating of the tip is primarily produced by heat conduction through the physical interface at the surfaces of contact between the body of tip 14 and the interior surfaces of arms 26, 28.

Figure 11:
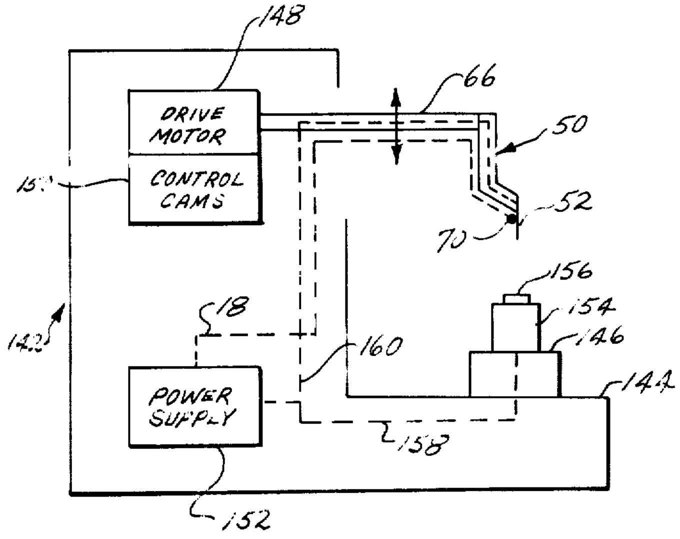
FIG. 11 is a block diagram illustrating mechanical and electrical relationships of various major components of a bonding apparatus according to the present invention.

A mechanical block diagram of a thermocompression bonder according to the present invention is shown in FIG. 11. The bonder 142 shown therein includes a housing 144 which supports a workstage 146 and also provides the enclosure for a drive motor 148, control cams 150 and a power supply 152. Drive motor 148 provides the mechanical drive for mounting block 66 from which the pulse heated tip assembly 50 is suspended. The drive motor is also mechanically linked to the control cams 150 which control the various operations of the bonder such as the time intervals during which the tip assembly is driven between its home, search and bond positions, the duration of the flame cut-off period, and the operation of the tail pulling wire clamp. Mounted on workstage 146 is a heater stage 154 which is adapted to receive a workpiece 156.

In normal operations of a thermocompression bonder according to the present invention heat is supplied to the workpiece by heater stage 154 to raise its temperature to a value as, for example, 250°C, which is not sufficiently high to have any effect on the characteristics of the heat sensitive workpiece 156 but is sufficient to supply some heat such that the bonding apparatus is not overstrained when the needed additional amount of heat to accomplish bonding is supplied from the capillary bonding tip 52. Electrical connections 158, 160 respectively from power supply 152 to the heater stage and to the pulse heated tip assembly are indicated as is the feedback connection 18 from thermocouple 70. As is indicated in FIG. 11, drive motor 148 embodies the capability of driving mounting block 66 in a vertical direction between an upper home position and a lower bonding position. Workstage 146 is mechanically positionable on its housing support 144 to precisely align and locate a bonding location on the workpiece directly beneath the bonding tip.

Figure 1:
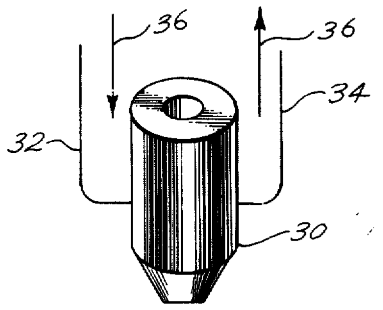
PRIOR ART FIG. 1
FIGS. 1 and 4 are elevational views of capillary bonding tips connected in a manner typical of prior art bonders.
Figure 4:
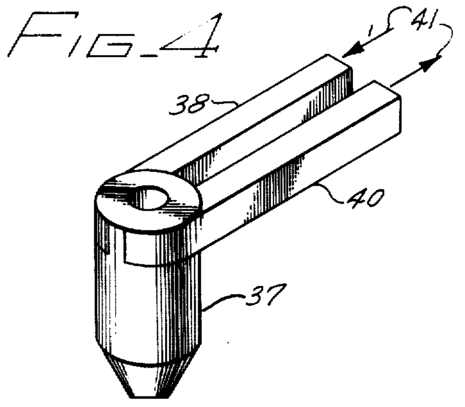

The indirectly heated, mechanical mounting of the bonding tip of the present invention is to be contrasted with the prior art, directly heated, mounting of capillary tips, such as those illustrated in FIGS. 1 and 4. As shown in FIG. 1, a capillary tip 30 has a pair of wires 32 and 34 welded on each side of the tip. The current path, as indicated by arrows 36, is through wire 32 and tip 30 and returned through wire 34. Similarly, FIG. 4 illustrates a bonding tip 37 which is held in position by a pair of clamps 38 and 40 and again current is introduced as indicated by arrows 41 to produce heating of the tip by directing it through the arms of the clamp and the tip, thereby causing the tip to be a part of the current carrying path.

Significant disadvantages are attendant upon the passage of current directly through the tip in that considerably greater thermal stresses are created in the tip, significantly reducing its life. Moreover, as the discussion in connection with FIG. 2 will indicate, the direct application of heating current to bonding tips according to the prior art was accomplished by means of a current pulse having power sufficient to raise the tip to or above a desired average bonding temperature. The amount of power in a given pulse to produce a certain temperature over a specified bonding interval (e.g. 0.5 sec.) imposed the necessity of raising the tip to a higher peak temperature.

Raising the temperature of the tip to a more elevated temperature substantially increases the oxidation of the tip itself and has been found to be a persistent cause of its failure due to clogging. Repeated subjection of tips of the prior art to large amounts of heat have also been found to affect the resistance characteristics of the tips, and the points of contact of the tips with the conductors. Such a variation in resistance characteristics causes a variation in the actual temperature to which the tips are raised and in the amount of heat supplied to a bond, resulting in bonds of inconsistent quality, both in terms of mechanical strength and electrical conductivity.

Figure 2:
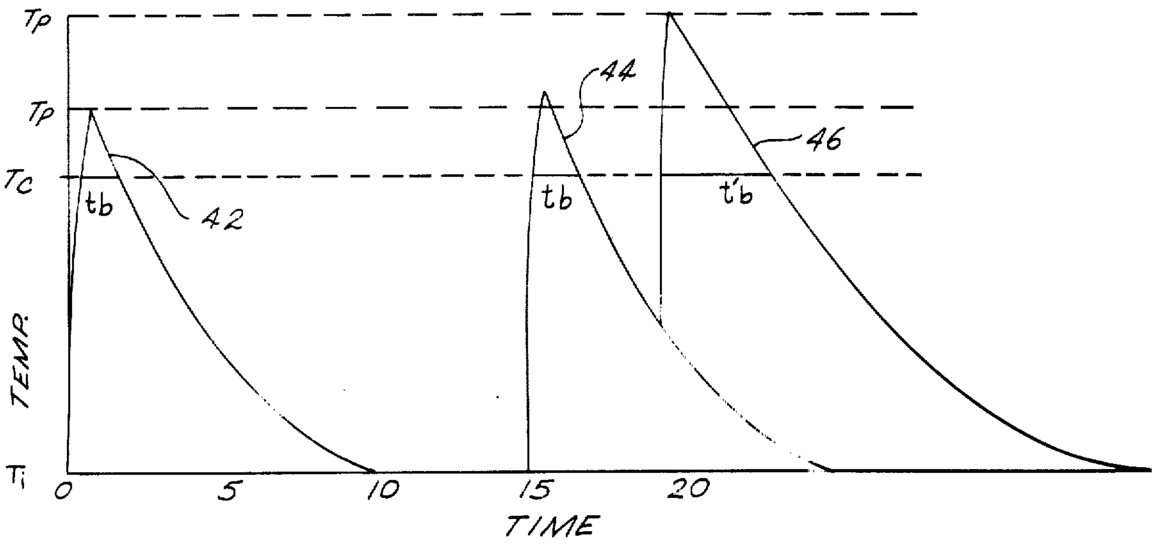
PRIOR ART FIG. 2
FIG. 2 is a time temperature diagram of the operation of a typical prior art bonder.

The prior art method of thermocompression bonding is also subject to inadequacies as is illustrated by reference to the time-temperature diagram of FIG. 2. In operation of a typical bonder, a pulse of current is supplied to a bonding tip for a predetermined amount of time to provide sufficient power to raise the temperature of the tip to an average bonding temperature $T_c$. In order to maintain the temperature of the tip at or above temperature $T_c$ for a predetermined amount of time (the bonding interval, $t_b$), the increment of power supplied is such that it raises the tip temperature above $T_c$ to peak temperature $T_p$. If sufficient time is allowed between bonds, the peak temperature $T_p$ and the effective bond time $t_b$ will be essentially constant, as is shown by peaks 42 and 44 in FIG. 2. However, in the event a sufficient amount of time is not allowed to permit the capillary tip to cool to its initial temperature ($T_i$), the same current pulse, that is, the normal increment of electrical power supplied to the tip will cause the peak temperature experienced by the tip to be raised to a substantially higher temperature value, $T'_p$ and will likewise increase the effective bond time $t'_b$ as is illustrated by peak 46 of FIG. 2. Since consistent bonds require close control of both the bonding time and the temperature of the tip (as well as the bonding force), the above system does not provide the necessary control and reliability to meet the varying conditions experienced in practice.

Figure 5:
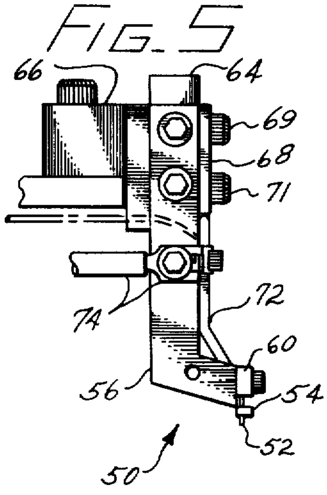
FIG. 5 is a side elevational view of a bonding tip mounting apparatus according to the present invention.

A preferred embodiment of the thermocompression bonder tip mounting assembly is shown in FIGS. 5 and 6 which are respectively side and front elevational views of a pulse heated, thermocompression bonding tip assembly 50. The assembly comprises a thermocompression bonding tip 52 mounted in a tip holder assembly 54 (see also FIGS. 7 and 8) which is, in turn, held in place with respect to a pair of contact plates 56 and 58 by means of clamp plates 60 and 62. Contact plates 56 and 58 are likewise mounted by a support block 64 which is clamped to mounting block 66 by means of a washer plate 68 and allen screws 69 and 71. A thermocouple 70 is electrically connected between tip holder assembly 54 and the bonder power supply (not shown) by means of a cable 77. A supply tube 72 for a gas such as nitrogen is extended into the area adjacent holder assembly 54 for providing an inert atmosphere enveloping the thermocompression bond location and the tip holder assembly to reduce the effects of oxidation at this location in extreme temperature applications. The current pulse supply and return leads 74 and 76 are shown clamped in position to contact plates 56 and 58 by means of allen screws 73 and 75.

Further details of the capillary tip holder assembly 54 are shown in the enlarged views of assembly 54 in FIGS. 7 and 8. As shown therein, the assembly comprises a pair of identical capillary tip holder plates 78 and 80 which are formed from a material such as nichrome and are fabricated such that they each have a pair of wing portions 82, 83, 84, 85, respectively, which are bridged together at one side thereof by arched portions 86, 87. Portions 82, 83 are joined to each other by a bonding process such as spot welding and both are provided with apertures 88 drilled through approximately the center of the mated and aligned wing portions for mounting the tip holder assembly 54 in position on the tip assembly by means of allen screws 61 and 63 and clamp plates 60 and 62. The arched portions 86, 87 define a tip aperture 90 for clamped and frictionfitted mounting of a capillary bonding tip 52 therein. The portions 84, 85 are not spot welded but are drawn together by means of the allen screws and clamp plates to provide the clamping action for the tip. The structure of the capillary tip holder 54 is such that replacement tips and tips of different types of material are readily interchangeable in the holder depending on the specific bonding appliction encountered, such different types of material being, for example, pure tungsten tips, tungstencarbide tips and glass tips.

As shown in FIG. 7, a nichrome ribbon 92 is spot welded to the arched portion of holder plate 78 and thermocouple cable 70 is likewise spot welded to ribbon 92 at the end thereof opposite its point of spot welding to holder plate 78 to locate the thermocouple in its temperature sensing relationship to the tip. The interchangeability of tips with the holder of the present invention is likewise enhanced by the connection of the thermocouple to the holder plates rather than to the tip itself.

Figure 9:
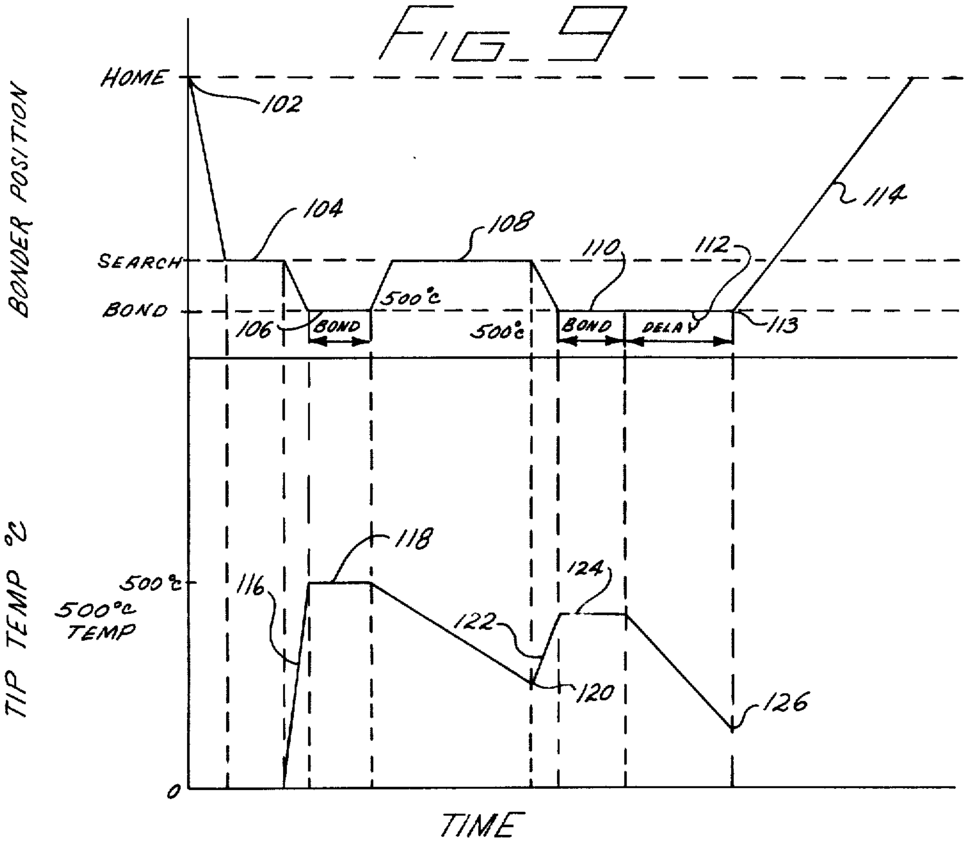
FIG. 9 is a diagram of the mechanical motion and temperature with respect to time of a bonder according to the present invention.

The operation of the bonder according to the present invention will be described in conjunction with the diagrams in FIG. 9 illustrating the relationship of the various positions and temperatures of the bonding tip with time. In the typical operation or cycle of a thermocompression bonder, a 1 mil gold wire is bonded to two locations such as two interconnection points on two semiconductor dice or chips which form part of a hybrid circuit. Before actual bonding operations are initiated, two bonding schedules are programmed into the apparatus. The desired temperature of each bond is preset by setting a control potentiometer and the bonding interval for each bond is established by setting a timer. Bonding pressure is established by proper weighting of the bonding tip support assembly. The thermocompression bonding tip starts its travel at a home position 102 and descends to a first search position 104. By manual or automatic operation, the workpiece is positioned at the bonding location directly below the bonding tip. When this first bond location is established, the tip is lowered to the point of contact with the die (first bond position 106) and a gold ball (previously formed on the end of the wire) is attached to the die at the desired point with the proper application of pressure and heat by the tip for a predetermined amount of time. At the completion of the bond the bonder returns to its search position and a second search 108 is begun. When the second bond location is positioned beneath the tip (the second bonding position 110), the tip is again lowered such that the gold wire contacts the die or substrate. Again proper exertion of pressure and application of heat by the tip for a predetermined amount of time produces the bond. The tip remains in position at the second bonding location until a predetermined amount of delay 112 has occurred such that the second bond cools to a temperature substantially below the bonding temperature. At the end of the time delay interval 112, the wire is detached from the second bond location by the motion of the bonding tip or by means of an auxiliary tail puller (not shown) as described in U.S. Pat. No. 3,430,834, which grasps the wire at a predetermined point along its extent between the bonding tip and the second bond location to detach the wire at a point immediately adjacent and beyond the second bond. The tip is then returned to its home position 102 as designated by motion line 114. The end of the gold wire extending from the tip is then flamed to produce a gold ball at the end of the wire preparatory to the next complete cycle of bonding operation.

A tip temperature-time diagram is shown in FIG. 9 below its corresponding bonding position-time diagram just described. As the bonding tip begins its movement from the home position to the first search position and thence to the first bond location, a first current pulse 116 is supplied to the bonding tip. When the temperature of the tip has reached a predetermined bonding temperature 118 (e.g. 400° -500°C) as sensed by the thermocouple, the bond timer is started and the supply of energy to the tip is interrupted. During the bonding of the wire at the first bond location, the thermocouple continues to sense the temperature at the bond location and generates a feedback signal to the power supply to provide additional amounts of electric power as needed. At the completion of the first bond, under the programming of the first bond control 20, as shown in FIG. 3, electric power to the tip is interrupted allowing it to cool to a lower temperature 120. As the second search is completed the bonding tip is lowered to the second bond location, a second electric current heating pulse which may be of a different magnitude than pulse 116 producing a rise in tip temperature 122 is supplied to the tip until a second programmed bonding temperature 124, as sensed by the thermocouple, is reached. Electric power is again interrupted and supplied to the tip as needed in response to the temperature as sensed by the thermocouple for the programmed second bonding interval time 110 under the programming of the second bond control 22 and is interrupted at the completion of this second predetermined bonding interval. The time delay programmed by control 24 then ensues and the tip is allowed to cool for an amount of time necessary for it to drop to a considerably lower temperature 126, for example, 250°C. At this point, the second bond having been allowed to cool to the point where the tail pulling operation can be effected, the gold wire is disconnected and the bonding tip is returned to its home position.

What is claimed is:

1. A pulse-heated thermocompression wire bonding apparatus comprising;

a capillary bonding tip having a wire to be bonded threadedly extending therethrough;

a holder supported by the bonding apparatus for receiving the tip in a thermal transfer relationship therewith;

electric power supply means connected to the holder;

means for moving the holder and tip such that the wire is contacted to a bonding location;

temperature control means connected to the power supply for limiting the amount of electric current heating energy supplied to the holder to an amount sufficient to raise the tip to a predetermined bonding temperature;

temperature monitoring means disposed in a sensing relationship with respect to the holder connected to the power supply means for interrupting the supply of electric current heating energy upon attainment of the predetermined bonding temperature at the holder and tip;

timing means responsive to the sensing of a predetermined temperature of the holder by the temperature monitoring means for maintaining contact of the wire of the bonding location for a predetermined interval of time;

feedback means interconnecting the power supply and temperature monitoring means for causing additional electric current heating energy to be supplied to the holder to maintain the temperature of the tip at the predetermined bonding temperature during the interval of contact of the wire at the bonding location; and means for interrupting the supply of electric current heating energy to the tip responsive to termination of the bonding interval.

2. An apparatus according to claim 1 wherein the feedback means includes programming means associated with the temperature monitoring means in a feedback relationship therewith and with the timing means for limiting the duration of time the tip is maintained in contact with the bonding location at the predetermined bonding temperature.

3. An apparatus according to claim 2 having a two bond cycle wherein said programming means includes first and second programming means in a first channel in the apparatus for establishing a bonding schedule for a first bond and third and fourth programming means in a second channel for establishing a bonding schedule for a second bond.

4. An apparatus according to claim 3 wherein said second and fourth programming means are associated with the timing means for presetting the duration of the interval for the application of heat and pressure between first and second bond location.

5. An apparatus according to claim 1 wherein the holder defines a tip receiving aperture and adjustable clamping means for securing the tip in said aperture.

6. An apparatus according to claim 5 wherein said holder defines an electric current carrying path around said tip such that heating of said tip is by heat transfer.

7. An apparatus according to claim 6 wherein the holder comprises a pair of strips of a conductive material having opposed arched portions, the strips being secured together such that the arched portions define the capillary tip receiving aperture therebetween.

8. An apparatus according to claim 3 wherein said first and third programming means are associated with said temperature monitoring means in a feedback relationship therewith for controlling the amount of heat supplied to said first and second bond locations.

9. An apparatus according to claim 8 including fifth programming means for introducing a predetermined amount of delay in the operation of the apparatus subsequent to the second bond.

* * * * *